United States Patent [19]

Le Marer et al.

[11] Patent Number: 4,538,383
[45] Date of Patent: Sep. 3, 1985

[54] FRONT SURFACE GRINDING MACHINE AND METHOD

[76] Inventors: René Le Marer, Kerougan Bras, 22730 Tregastel; Robert P. Delebecque, 156bis, rue d'Aulnay, 92290 Chatenay Malabry, both of France

[21] Appl. No.: 448,070

[22] Filed: Dec. 9, 1982

[30] Foreign Application Priority Data

Dec. 18, 1981 [FR] France .................. 81 23721

[51] Int. Cl.³ .................. B24B 1/00; B24B 7/00
[52] U.S. Cl. .................. 51/124 R; 51/56 R; 51/165.79; 51/217 R; 51/234; 51/283 R; 269/239; 269/254 CS; 269/274
[58] Field of Search ............... 51/56 R, 110, 114, 115, 51/116, 112, 109 R, 122, 123 R, 124 R, 127, 128, 165.75, 165.79, 165.78, 165.81, 165.89, 216 R, 216 LP, 217 R, 234, 283 R, 131.3, 134; 269/239, 254 CS, 274

[56] References Cited

U.S. PATENT DOCUMENTS

| | | |
|---|---|---|
| 653,531 | 7/1900 | Richmond et al. .................. 51/283 |
| 1,402,700 | 1/1922 | Winquist .................. 51/115 |
| 2,392,819 | 1/1946 | Gruenberg et al. ......... 51/165.81 X |
| 2,799,125 | 7/1957 | Dicke .................. 51/116 X |
| 2,885,832 | 5/1959 | Briggs .................. 51/127 X |
| 3,299,579 | 1/1967 | Jacobson .................. 51/115 |
| 3,322,423 | 5/1967 | Popow et al. .................. 269/274 |
| 3,653,160 | 4/1972 | Raickle .................. 51/111 R X |
| 4,335,873 | 6/1982 | Kiefer .................. 269/274 X |
| 4,384,431 | 5/1983 | Jackson .................. 51/283 R X |

FOREIGN PATENT DOCUMENTS 96860 11/1922 Switzerland .................. 269/254 CS
441022 1/1936 United Kingdom .

OTHER PUBLICATIONS

Brown, F. L. et al., "An Automatic Polishing Machine for Remote Metallography", *Argonne National Laboratory*, ANL-5904, (Aug. 1959), pp. 9–13.

*Primary Examiner*—Robert P. Olszewski
*Attorney, Agent, or Firm*—Lowe, King, Price & Becker

[57] ABSTRACT

Each workpiece holder of a grinding machine is reciprocated relative to and turned about an axis parallel to that of a wheelhead spindle. Workpieces carried by the holder are brought from in front of and to the side of an abrasive wheel front working surface into contact with the working surface. To prevent the pieces ground by the abrasive wheel from being scratched, after the workpieces have been ground, the wheelhead spindle is translated from a region where the grinding is performed. Simultaneously the workpiece holder is turned from in front to the side of the abrasive wheel working surface. The grinding machine, for instance, comprises two workpiece holders that are diametrically opposed with respect to the abrasive wheel. The holders turn in opposite reciprocating directions. The workpiece holders carry two half-holders for optical fibers having ends to be connected together. The ends of the fibers are simultaneously and coplanarly ground by the machine.

30 Claims, 11 Drawing Figures

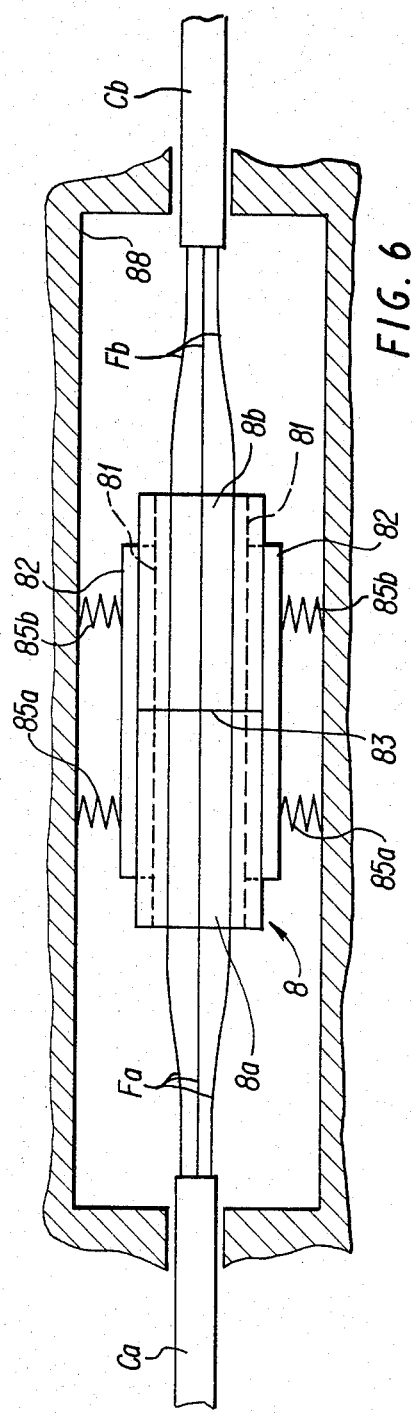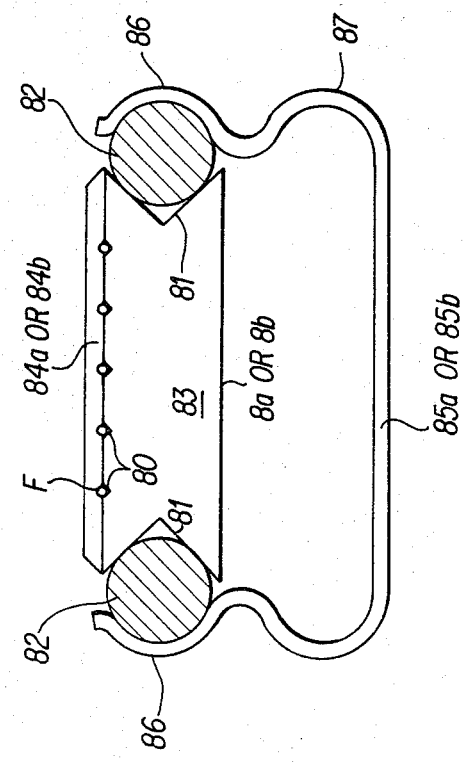

FRONT SURFACE GRINDING MACHINE AND METHOD

BACKGROUND OF THE INVENTION

1 Field of the Invention

This invention relates to a front surface grinding machine and method of operating same, and more particularly to a machine for and method of grinding down the sides of very small pieces and in particular two pieces to be placed end to end, for instance the end surfaces of optical fibers mounted on connection holders for two multifiber cables.

2 Description of the Prior Art

To butt optical fibers end to end, several methods are known, among which note is made of the following:

(1) bonding fibers end to end by partial fusion of the ends, after the fibers have been brought together;

(2) cutting fibers by a very slight preliminary break on each fiber, followed by traction; this method affords sufficient surface quality for a satisfactory connection quality when the fibers to be connected are laid end to end and an index adaptor agent is applied;

(3) cutting fibers with no particular precaution, fixing in a holder generally by bonding, and manual polishing of the end faces constituting the fiber connection plane.

The first two methods are usually employed when the fibers must be connected one by one.

The present invention is particularly concerned with the third method. When several fibers are to be connected together, such as in the case of numerous fibers in two bundles or cables, advantage can be gained by simultaneously dealing with all the fibers at the same time. This method enables a substantial reduction in the individual handling for each pair of fibers and thus the time taken to connect them. This simultaneity in dealing with the fibers is achieved both for the unsheathing, positioning or bonding operations and for simultaneously aligning all the fiber tip ends so that they lie in the same plane.

To achieve this alignment, it is necessary to resort to a grinding machine usable under good conditions, especially for connecting optical fiber cables in situ. Experience has shown it unnecessary to undertake polishing of the opposite optical fiber ends. One fine grinding run is sufficient whilst doing the utmost to obtain excellent geometric definition.

Front surface grinding machines are described in U.S. Pat. No. 3,299,579 and U.K. Pat. No. 441,022. Such a grinding machine comprises an abrasive wheel, a wheelhead spindle, means for rotating the spindle, a single workpiece holder, and means for imparting reciprocating rotational motion to the holder about an axis parallel to that of the spindle; the holder motion is in a circular sector having ends wherein the holder is respectively in front, i.e., at the center, and to the side of the front working surface of the abrasive wheel.

According to U.S. Pat. No. 3,299,579, the workpiece holder is a rotating arm including a workpiece guidance recess. The means for imparting reciprocating rotational motion to the workpiece holder is a crank arm. Two superposed and coaxial circular abrasive wheels simultaneously grind opposite faces of a workpiece. Each abrasive wheel includes three concentric abrasive portions having different grades or hardnesses such that the piece is initially rough ground and then ground ever more finely as it passes from the circumferences towards the centers of the two wheels. During each grinding cycle, the workpiece holder recess receives the lowest piece in a stack of such pieces in a chute when the holder is on the side of the abrasive wheels; then the holder pivots towards the center of the two wheels to progressively grind the two workpiece faces; finally, the piece thus ground falls towards an endless belt conveyor through a central circular column, coaxial with the hollow spindle carrying the lower abrasive wheel. During grinding, the piece is not actually carried by the workpiece arm but is driven thereby. While the piece is rotated a guide directs it to the opposite working surfaces of the two abrasive wheels. The piece may even rotate on its own axis when it is being "rough" and "intermediate" ground by the outer peripheral and intermediate abrasive portions. In the other rotational direction, the workpiece holder pivots away from the center of the abrasive wheels towards the workpiece input stack, without carrying a workpiece.

In U.K. Pat. No. 441,022, the workpiece holder is a swinging arm that is subject to reciprocating motion between the outer circumference and the center of two coaxial and superposed abrasive wheels by a connecting rod, pivoted arm and eccentric path cam arrangement. The workpiece holder is in the form of a vise capable of gripping one or more pieces, such as bricks. In this case, the pieces are ground during the two reciprocating motions of the workpiece holder. The return motion, from the center to the edges of the abrasive wheels, scratches the brick workpieces; scratching is of no importance to the present invention since the workpieces are not bricks. If however the workpieces are fragile elements, such as optical fibers to be joined together, scratches on the fiber end surfaces give rise to deleterious properties. When the fibers are joined end to end the scratches introduce considerable optical signal transmission insertion loss.

The grinding method as per U.S. Pat. No. 3,299,579 partly solves this drawback since the pieces are only ground during the first rotational motion, from the edge towards the center of the two abrasive wheels. However, such a method cannot be employed for grinding the ends of optical fibers fixed onto a holder. First of all, such multifiber holders are not stackable and cannot fall by gravity onto the center of the abrasive wheels, as the fibers come from a bulky, difficult to handle cable, unlike small individual pieces. Secondly, the multifiber holder must be firmly fixed to the workpiece holder so as to obtain optical fiber alignment faces that are strictly coplanar and ground to a very high degree of accuracy. If such were not the case, this would cause misalignment and lack of parallelism of the optical fiber ends to be butted end to end.

OBJECTS OF THE INVENTION

The main object of this invention is to overcome the previously mentioned drawbacks.

Another object of this invention is to provide a grinding machine in which the pieces are ground from the edge to the center of the abrasive wheel during pivoting of the workpiece holder, wherein the pieces do not stay in contact with the abrasive wheel when the workpiece holder pivots in the opposite direction, in order to obviate any scratches on the ground pieces. Such scratching must in particular be avoided when the front working surface of the abrasive wheel has concentric circular portions having different structures and/or grades.

SUMMARY OF THE INVENTION

Accordingly, a front surface grinding machine and method of the invention comprises means for and the step of imparting translational motion to the wheelhead spindle in parallel to the spindle axis after a workpiece has been ground. The spindle is thus pulled back from the rotary path that the workpiece traverses. Simultaneously the workpiece holder rotates from in front of the abrasive wheel working surface to the side of the working surface where the ground workpieces are removed. Thus, the rotational path of the workpiece holder towards the center of the abrasive wheel front surface constitutes the sole grinding run for the workpieces. Because there is no contact between the ground workpieces and the abrasive wheel when the workpiece holder rotates in returning to the side of the abrasive wheel, the ground workpieces are easily withdrawn.

According to another aspect of the invention, such a reciprocating rotational motion of the workpiece holder enables a second workpiece holder to be provided. The second holder is driven by reciprocating motion imparting means analogous to those of the first workpiece holder. Preferably, the two workpiece holders are substantially diametrally opposed with respect to the center of the abrasive wheel or, generally speaking, symmetrically arranged with respect to a diametral axis of the abrasive wheel, and have opposite reciprocating motions imparted to them. This enables the edges of two multifiber holders and the end faces of the optical fibers attached to the multifibers holders to be ground simultaneously, thereby yielding strictly coplanar faces.

According to a further aspect of the invention, the duration of the grinding operation is reduced still further because the workpiece holder rotational speed in moving from the side towards the front of the abrasive sheel front working surface where the workpieces are ground is slower than that of the workpiece holders in moving in the opposite direction from in front of the abrasive wheel to the side of the wheel, where the ground workpieces do not contact the abrasive wheel.

Preferably, the means for imparting motion to the rotating and sliding members included in the machine frame are pneumatic motors in order to ensure a high degree of safety for the personnel operating the machine. In a further embodiment, when certain driving means are electric motors, the invention provides means for ventilating forced air through the machine frame in order to cool the electric motors, as well as remove any water that may seep in via the water-tight seals surrounding the rotatable members protruding from the frame. The pressurized water is sprayed by an auxiliary device for cooling the front working surface of the abrasive wheel and the workpieces being ground.

A feature of the inventive front surface grinding machine for grinding the ends of optical fibers flush with a transverse edge of a multifiber holder for connecting optical fiber cables, is that each workpiece holder is fixed to a vise having semi-cylindrical jaw teeth. The vise envelopes two parallel and longitudinal grooves made in the multifiber holder. The grooves of the multifiber holder align two identical multifiber holders and connect the fibers thereof end to end. Generally speaking, however, the vise and jaw teeth thereof are matched to the shape of the multifiber holders, i.e., of the workpiece to be ground. The vise is fitted with means, such as a spring, for limiting the jaw tightening loads to prevent damage to the relatively fragile multifiber holder.

BRIEF DESCRIPTION OF THE DRAWING

Other features and advantages of the present invention will become apparent from the following detailed description of preferred embodiments of the grinding machine with reference to the accompanying correspondent drawings in which:

FIG. 6 is a schematic axial sectional view of a device for connecting two optical fiber cables;

FIG. 7 is a view of a sawed edge to be ground of a multifiber holder equipped with alignment cylinders;

DESCRIPTION OF THE PREFERRED EMBODIMENTS

Figure 1:
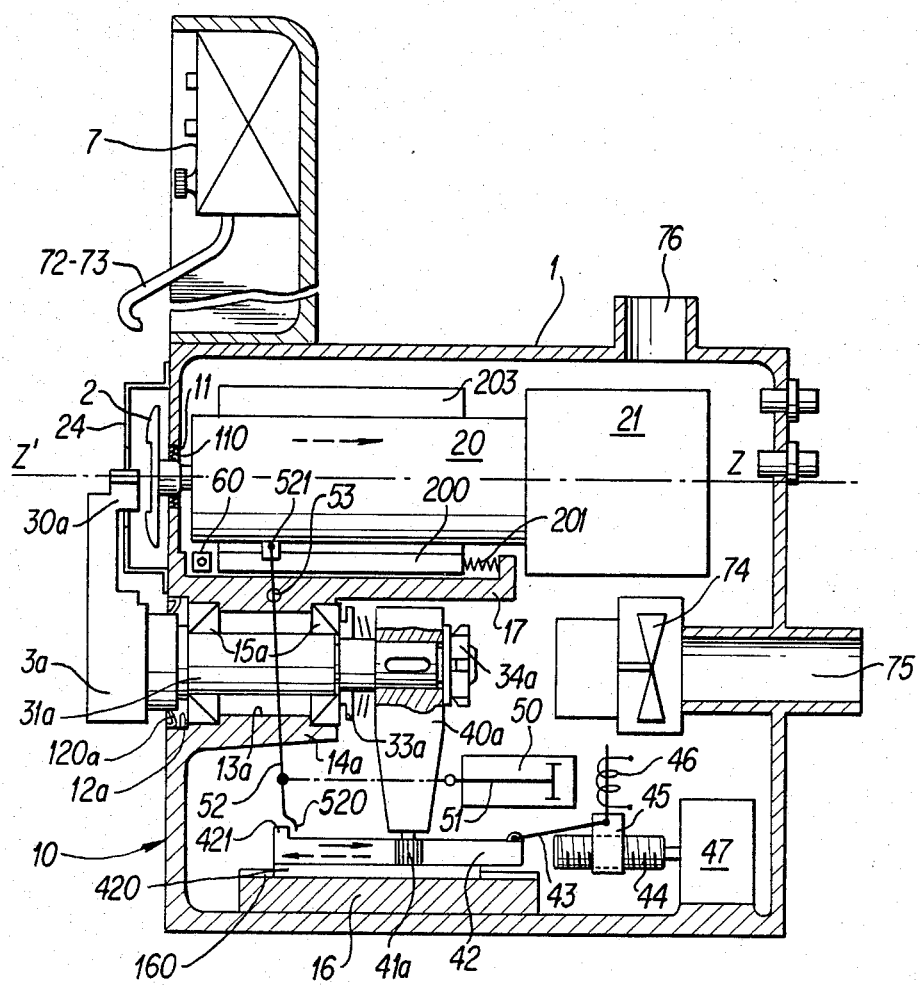
FIGS. 1 and 2 are schematic longitudinal side views of the first and second preferred embodiments of a grinding machine across a section of the frame along the dotted line I—I in FIG. 3, wherein the first and second embodiments respectively include an electrical motor and pneumatic motor for rotating the abrasive wheel spindle.
Figures 3, 5:
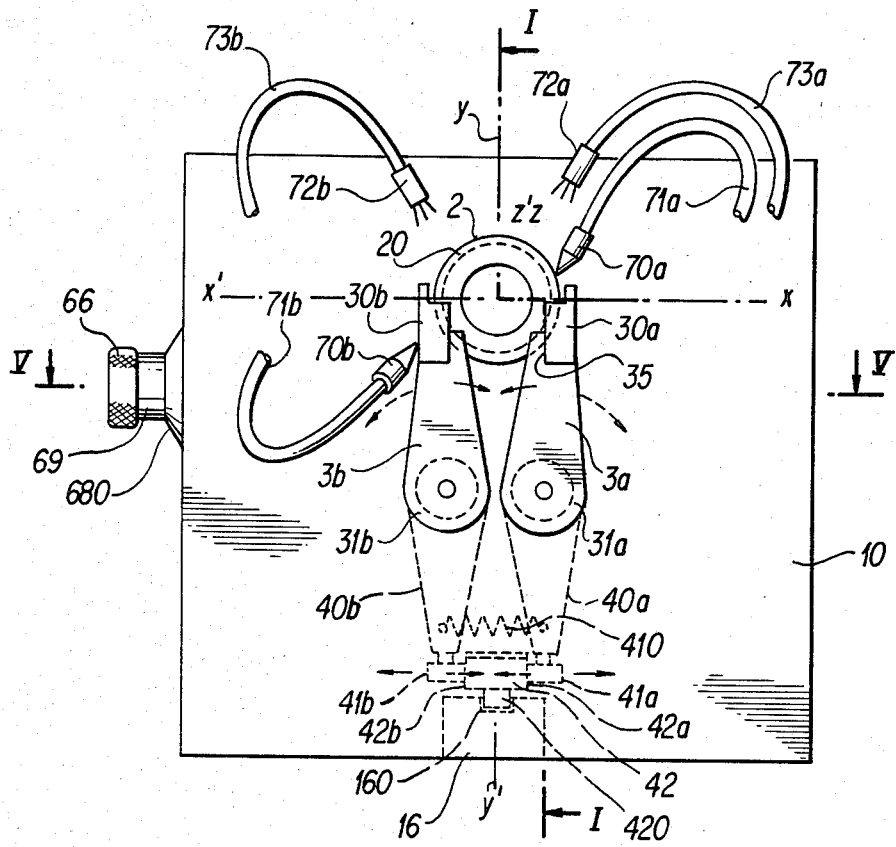
FIG. 3 is a schematic front end view of the machine frame with two workpiece holders.
FIG. 5 is a partial cross-sectional view, along the line V—V in FIG. 3, of the means for adjusting the run depth.

The front surface grinding machine as illustrated in FIGS. 1 and 3 comprises a circular abrasive wheel 2 and two oscillating workpiece holders 3a and 3b, positioned in front of front face 10 of frame 1.

The abrasive wheel 2 is fixedly mounted in a known manner on the outside front end of rotating wheelhead spindle 20 that is mounted to extend through annular sealing means 110, in a bore 11 in the front face 10 of frame 1. Sealing means 110 may be an appropriate element such as O-rings, flexible leather, or rubber boots. The abrasive wheelhead spindle 20 is positioned in the upper inside part of the frame 1 so it extends along a horizontal longitudinal axis Z'Z. The end of spindle 20 opposite from wheel 2 is rotatably driven by motor means attached to the frame 1. The motor for driving the spindle in rotation can be electric motor 21, FIG. 1, or compressed air motor 22 associated with a pulley and belt system 23, FIG. 2.

Figure 2:
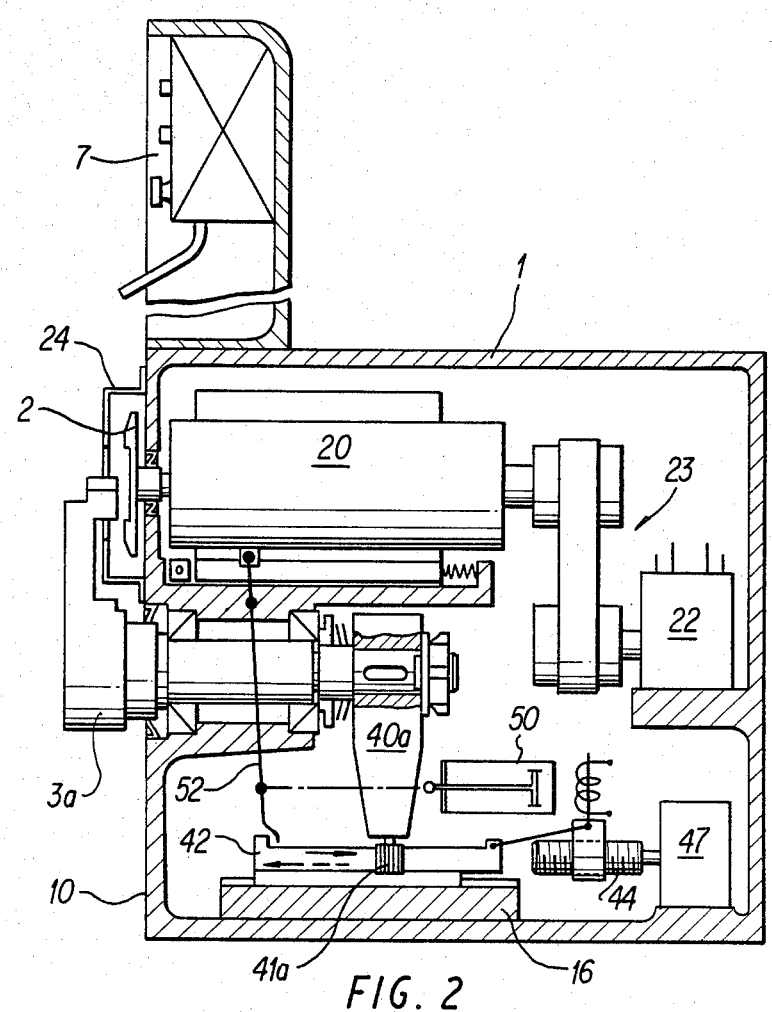

The abrasive wheel 2 is surrounded by a protective cowl 24, secured to the front face 10 of frame 1. Cowl 24 has two arc-segment slots into which extend the upper oscillating ends 30a, 30b of the two workpiece holders 3a, 3b; holders 3a and 3b carry the workpieces to be ground. (Frequently in this Description of the Preferred Embodiments reference is made to pairs of like elements having the same reference numerals, followed by the letters a and b. Generally only the element with the letter "a" is on the drawing and the element with the letter "b" is hidden from view but is positioned symmetrically with respect to the "a" element. Hence the "b" elements are included in the Description for clarity but are not redundantly illustrated.) As shown in FIGS. 1 to 3, the lower ends of the workpiece holders 3a, 3b are secured to front outer end faces of rotating shafts 31a, 31b, respectively mounted to extend through water-tight boots 120a, 120b, positioned in bores 12a, 12b in the front face 10 of frame 1. The rotation axes of shafts 31a, 31b are symmetrical with regard to the vertical diametral plane Y'Y-Z'Z of the abrasive wheel 2 and are spaced from this plane virtually by an amount equal to the average radius of the front working surface of the abrasive wheel 2. The distance between the horizontal plane containing the axes of shaft 31a, 31b and the horizontal diametral plane X'X-Z'Z of abrasive wheel 2 determines the length of the workpiece holders 3a, 3b. Holders 3a and 3b are analogous to oscillating levers 3a 3b such that the workpieces attached to the ends 30a, 30b lie substantially in the horizontal plane X'X-Z'Z.

The sealed bores 12a and 12b that extend longitudinally inside of frame 1, are defined by the cylindrical surfaces of bores 13a, 13b in bosses 14a, 14b; bosses 14a and 14b are integral with frame 1. Ball-bearing units 15a, 15b, having tapered symmetrical angles, are respectively mounted in the bores 13a, 13b to form bearings for the shafts 31a, 31b. The interior ends of shafts 31a, 31b are respectively held in place against the upper ends (said first end) of vertical elongated legs 40a, 40b by transverse keys 32a, 32b. Each pair of drive mechanisms made up of shafts 31a, 31b and legs 40a, 40b is prevented from being longitudinally translated by two stops 33a 33b and 34a 34b on shafts 31a and 31b, respectively. Each of stops 33a, 33b comprises a stack of elastic washers for taking up play and respectively bears against rear face of the bearings 15a and 15b at the interior ends of shafts 31a and 31b; the front shoulders of shafts 31a 31b bear against the adjacent bearings 15a and 15b, respectively. The other stops 34a 34b, each formed as a locking stop with a stop ring and nut, are set at the inner ends of the shafts 31a and 31b against the rear upper ends of legs 40a, 40b.

Figure 4:
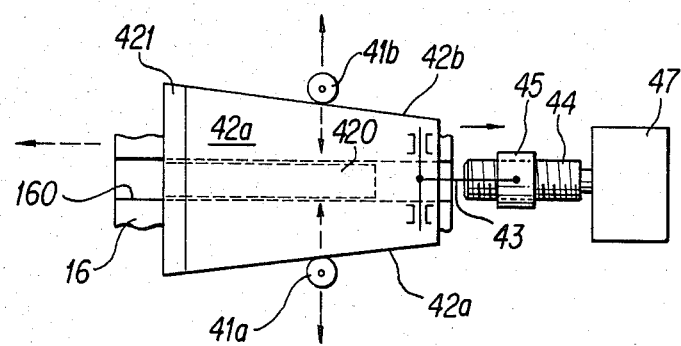
FIG. 4 is a schematic plan view of the means for imparting reciprocating motion to the workpiece holders.

Referring to FIGS. 3 and 4, rollers 41a, 41b are rotatably mounted so they extend downwardly from the lower end (said second end) of legs 40a, 40b. The rollers 41a and 41b respectively roll against two ramps 42a and 42b which form sloping sides of a central longitudinal slide 42 that has an isosceles trapezoidal horizontal profile. The sloping sides 42a and 42b subtend an acute angle with the longitudinal axis Z'Z and thus with the axes of the rotating shafts 31a and 31b. Opposite ends of a helicoidal spring 410 are respectively attached to the lower ends of legs 40a and 40b to urge the lower ends of the legs toward each other. The spring 410 draws the rollers 41a and 41b against the respective sloped sides 42a and 42b The slide 42 has a subjacent tongue 420 which slides in the longitudinal groove 160 of a guide 16 that is attached to frame 1 so the guide extends upwardly from the floor of the frame. Slide 42 slides along a horizontal axis, in the vertical diametral plane Y'Y-Z'Z of the abrasive wheel 2. The vertical ramps 42a and 42b are symmetrical with respect to the sliding axis of slide 42 and diverge as they approach frame front face 10. As slide 42 progressively moves away from the front face 10, the rollers 41a and 41b roll on the vertical ramps 42a, 42b and move away from the sliding axis. As a result, the upper ends 30a and 30b of the workpiece holders carrying the workpieces to be ground come closer to the rotation axis Z'Z of the abrasive wheel 2 and describe two circular arcs which are diametrally and respectively opposite those described by legs 40a and 40b moving away.

The means for translating slide 42 slowly rearwards comprises, according to the embodiment shown in FIGS. 1 and 4, a rod 43, that is connected to nut 45, mounted on endless screw 44 that is turned by motor 47. Perpendicular translation of nut 45 relative to endless screw 44 is controlled by electromagnet releasing means 46. The opposite ends of the rod 43 are respectively rotatably mounted at the rear end of the slide 42 and on the nut 45. Electromagnet releasing means 46, FIG. 1, or an equivalent actuator, winds up nut 45 or engages it on the endless screw 44. The motor 47, which can be electric or pneumatic, is secured to the upper side of the face of the frame 1. Motor 47 drives the endless screw 44 in both the clockwise and counter-clockwise directions about its longitudinal axis.

The progressive withdrawal of the slide 42 rearwards is achieved by endless screw 44 driving nut 45, thereby permitting relatively slow movement of the workpieces against the front grinding surface of the abrasive wheel 2; this slow movement is in contrast with the rapid return of the workpieces after they have been ground, as will be seen hereinafter. The workpiece holder 3a, 3b speeds may be set in both pivoting directions by regulating the speed of the motor 47.

After the grinding run, the motor means 21 or 22 is activated to impart rapid translation to the wheelhead spindle 20, whereby abrasive wheel 2 is rapidly driven parallel to axis Z'Z toward the rear of frame 1. This simultaneously imparts rapid forward translation to the slide 42, thereby quickly moving the abrasive wheel 2 away from the upper ends 30a, 30b of the holders 3a, 3b which carry the ground workpieces. The translational motor means for slide 42 is illustrated in FIG. 1 as comprising a pneumatic actuator 50 having rod 51 rotatably anchored to the lower arm of a lever 52. The pivot point 53 of the lever 52 is rotatably mounted about a horizontal axis that is parallel to the axis X'X and is integral with the frame 1. Axis X'X extends between the spindle 20 and the slide 42 above the internal bosses 14a and 14b. Lever 52 includes a relatively short upper arm and a relatively long lower arm. Consequently the withdrawal path taken by the abrasive wheel 2 is shorter than the advancing motion of the slide 42 and the movement of the upper holder ends 30a, 30b towards the initial positions thereof. The lever 52 pivots in the vertical plane Y'Y-Z'Z of the abrasive wheel 2 between the internal bosses 14a and 14b. The lower arm of lever 52 has an end 520 that is designed to push a front upper protrusion 421 of the slide 42 towards the front face 10. The lever 52 upper arm end is rotatably anchored at pivot point 521 to a subjacent tongue 200 on the wheelhead spindle 20. Tongue 200 slides in a longitudinal guide 17 formed inside the frame 1, above the bosses 14a and 14b. The tongue 200, which is part of the housing forming a spindle bearing, is urged against the front end of the guide 17 by a compression spring 201.

When the actuator 50 drives the piston rod 51 forwards toward the front face 10, after slide 42 has withdrawn and the workpieces have been ground, nut 45 is disengaged from the endless screw 44 by the electromagnet 46. The wheelhead spindle 20 then slides along the axis Z'Z over a short recoil path against the spring 201, to disengage the abrasive wheel 2 quickly from the circular return paths at the upper ends 30a, 30b of the workpiece holder 3a, 3b. Simultaneously, the lower arm 520 of the lever 52 rapidly pushes the stop 421 of slide 42 forward so that the rollers 41a and 41b come closer together and the ends 30a and 30b of the workpiece holders quickly separate from each other so they return to their initial positions where the ground pieces are removed.

In reference to FIG. 5, the grinding machine comprises grinding run depth adjusting means 6 for controlling the front surface of abrasive wheel 2 with respect to the vertical surfaces of the workpieces to be ground, i.e., with respect to the upper ends 30a, 30b of the workpiece holders 3a, 3b. Adjusting means 6 comprises a wedge 60 having a horizontal cross-section, in the form of a rectangular trapezium having a long side 61 slightly inclined to the axis X'X. Wedge 60 bears against face 202 on one side of tongue 201 having another side that is urged by rear spring 201 toward the wedge. Face 202 of tongue 200, opposite from the face engaged by spring 201, and the adjacent face of wedge 60, subtend the same angle with respect to the axis of stud 63. Tongue 200 slides in the upper guide 17. The other long side 62 of the wedge 60, opposite to side 61, is perpendicular to the axis Z'Z and slides against the vertical front end wall 170 of the guide 17. One end of the wedge 60 is fixedly connected to a threaded stud 63 which is screwed into the closed and tapped bore 64 in the end of a nut 65. Nut 65 has a knurled head 66, accessibly mounted on the exterior of a vertical wall on the outside of the frame 1, as depicted in FIG. 3. The smooth shank of the nut 65 between the head 66 and the closed end of bore 64, which runs through annular seal 67 in opening 18 in the aforesaid wall of frame 1, is axially held in the opening by a conventional spacer arrangement using stops rings 680 and 681. The outer stop ring 680 comprises a reference index. A circular scale vernier 69 is integral with the nut 65 and subjacent the head 66. Rotation of the head 66 and the vernier 69 induces translational motion in the wedge 60 which adjusts the front position of the tongue 200 which butts up against the long sloped side 61 of the wedge 60 during the grinding run. Rotation of the vernier 69 with respect to the reference index thus indicates the depth of the abrasive wheel 2 run. The adjusting means 6 provides a very fine depth adjustment. Here again, no slide motion of the members occurs outside of the machine; the seal is achieved around a cylindrical member, such as the smooth shank of the nut 65.

As shown in FIGS. 1 and 2, the top of frame 1 carries control console 7 in which are lodged all the knobs and levers controlling the driving means, such as motors 21 or 22, electromagnet 46, motor 47 and motor 50. These driving means can be individually or automatically activated via electromechanical transmission means (not shown) in order to perform a workpiece grinding operation including the steps of:

- initially securing the workpieces to the upper ends 30a, 30b of the holders 3a 3b and setting the appropriate grinding run depth using adjusting means 6;
- then withdrawing the slide 42 by engaging the nut 45 on the rotating endless screw 44 while simultaneously pivoting the ends 30a and 30b towards each other in front of the front working surface of the rotating abrasive wheel 2 in order to grind the workpieces, as indicated by the arrows in full in the drawing;
- then, disengaging the nut 45 from the endless screw 44 and activating the actuator 50;
- then reversing the motion of the spindle 20 and the rotating abrasive wheel 2 while simultaneously driving slide 42 forward to move the ends 30a and 30b, whereby the ground workpieces move back to initial positions thereof where the pieces are removed from the workpiece holders 3a, 3b, as indicated by the arrows in dashed lines in the drawing.

As depicted in FIGS. 1 to 3, auxiliary means can be provided for enhancing the grinding operation and are accessible from the control console 7.

Two nozzles 70a and 70b are carried by stirrups fixed to the front face 10 of the frame 1, on the protective cowl 24. Nozzles 70a and 70b are symmetrically pointed towards the front working surface of the abrasive wheel 2 in line with the transverse axis X'X. The nozzles 70a and 70b are connected via flexible hosing 71a and 71b to a compressed-air water spray device which sprays water during the grinding operation.

Two small spot-lights 72a and 72b are connected via flexible electrical conductor leads 73a and 73b to a low voltage generator. The two spot-lights 72a and 72b are fixed with stirrups to the outside of the protective cowl 24 to illuminate the two diametrally opposed working zones on the abrasive wheel 2.

In the particular case of the driving means comprising electric motors, forced air flow is provided inside the frame 1 by fan 74 that is inserted in air intake conduit 75 that extends through the rear wall of the frame 1. The flow path established by fan 74 extends through air outlet conduit 76, running through the upper wall of the frame 1, as shown in FIG. 1. The fan 74 cools the electric motors and creates an overpressure inside the frame 1 thus eliminating any risk of water infiltration from the nozzles 70a and 70b should any of the seals in the device, such as seals 110, 120a and 120b, not be wholly water-tight.

It will be observed that other embodiments may be deduced by those skilled in the art and be based on the foregoing description relative to a preferred embodiment of the grinding machine.

Hence, instead of the sloped sides 42a and 42b of the slide 42 or ramps for the rollers 41a and 41b being convergent towards the rear of the machine, they could be convergent toward the front face 10 of the frame; in this case, the slide 42 moves towards the front face 10 while the workpieces are being ground and moves backwards in the frame when the ground pieces disengage from the abrasive wheel front surface; the lever 52 pushes the slide 42 and wheelhead spindle 20 to the rear of the frame and the pivot axis of the lever 52 comes above the thrust zones 521 and 520.

In another embodiment, workpiece holder 53 and legs 40 are not diametrally opposed relative to shafts 31. For example, legs 40 oscillate above shafts 31 and laterally to the spindle 20, whereas the slide 42 slides in a guide above the spindle 20.

Lastly, in another embodiment, the function of slide 42 is obtained by a rotatable cam driven by a reduction gear and a free-wheel hub.

It will further be observed that the machine forms a relatively small and light parallelepipedal block unit and is easily portable.

Utilization of a grinding machine embodying the invention for grinding the ends of optical fibers in multifiber cables, with a view to connecting them, is now described.

FIGS. 6 and 7 are illustrations helpful in understanding how the end faces of fibers Fa and Fb of two multifiber cables Ca and Cb having an axially symmetrical structure are connected two by two on a flat holder 8.

The grooved cores of the cables around which the fibers are evenly and circularly spaced have been sawed after the cables have been unsheathed and the optical fibers formed outwardly.

The holder 8 is an elongated parallelepipedal substrate having a plane major face. Extending along the whole length of the major face are parallel longitudinal V-shaped grooves 80, each designed to receive the unsheathed ends of two fibers Fa and Fb to be placed end to end. The longitudinal edges of the holder 8 incorporate parallel grooves 81 having either a wide or pointed V-shaped cross-section. Grooves 81 are designed to accept two calibrated cylinders 82. Holder 8 is designed to be clamped in the vise jaws of the grinding machine. The holder 8 has a transverse median plane including one or more small transverse grooves 83, which assist in initiating the break or as a sawing line for separating the holder 8 into identical halves 8a and 8b.

After holder 8 has been sawed, the fibers Fa and Fb are folded down into the grooves 81 of the respective half-holders 8a and 8b where they are held by a fast-setting bonding agent (not shown) and/or by application of half-plates 84a, 84b that are also grooved and obtained from a single plate 84 which covers the half-holders. At this stage, the ends of the fibers protrude slightly from the transverse edges of the half-holders 8a and 8b corresponding to the small groove 83.

The edges 83 of the half-holders 8a and 8b are then ground in conjunction with the ends of the optical fibers Fa and Fb using the grinding machine embodying the invention.

Figure 8:
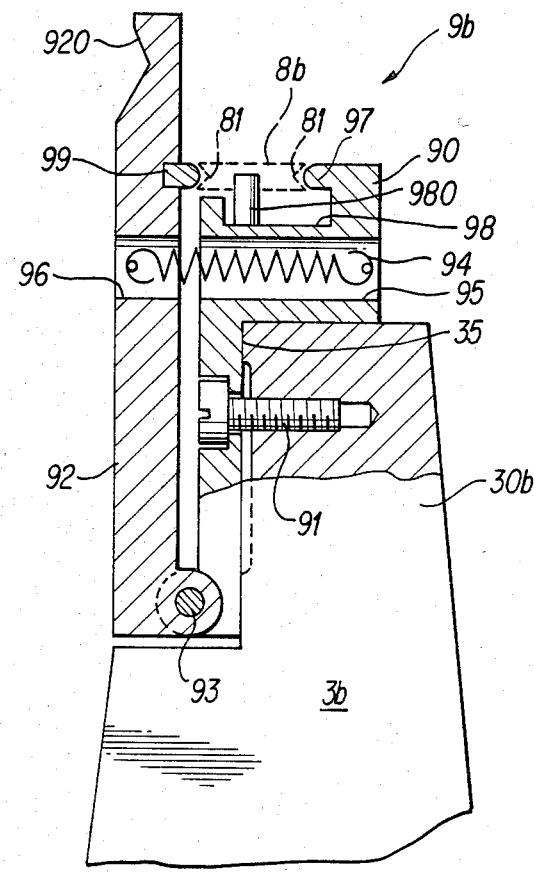
FIG. 8 is a partially sectional face view of the upper end of a workpiece holder carrying a vise for clamping a multifiber holder.

FIG. 8 is a detailed view, by way of example, of the upper end 30b of workpiece holder 3b which is adapted to accept half-holder 8b. Incorporated in the top of end 30b is a notch having a vertical elonged side 35 that is practically parallel to the plane Y'Y-Z'Z when the half-holder 8b is being ground, as indicated in FIG. 3. The notch is turned away from the abrasive wheel 2. Jaws 90 of a vise 9b have vertical and horizontal intersecting faces that are respectively held in situ against the long side 35 of the notch and the horizontal upper side of the end 30b by bolt 91, screwed into a horizontal tapped hole in the end 30. A second jaw 92 of the vise 9b, shaped as a parallelepiped, is pivotable about a horizontal pivot 93 that is parallel to the longitudinal axis Z'Z and which is attached to the lower portion of the other jaw 90 in front of the corner of the notch in the end 30b. The vise 9b is equipped with helicoidal traction spring 94, for limiting the tightening loads. Spring 44 is embodied in one of jaws 90 or 92 to push the clamping tooth 97 or 99 thereof towards the clamping tooth of the other jaw. Alternatively, spring 94 is anchored in two holes 95, 96 of jaws 90, 92 to draw the jaw 92 towards the jaw 90. The half-holder 8b is withdrawn from the vise 9b, by acting on the upper portion of the jaw 92 in which a gripping notch 920 is formed; in particular by pivoting the jaw 92 about the pivot 93 against the pull exerted by the spring 94.

The jaw teeth, such as the tooth 97 in the jaw 90, can both be calibrated semi-cylindrically in shape with the same diameter thereof as the calibrated cylinders 82 (FIG. 7). The fiber ends Fb and the cut edge of the respective half-holder 8b are thus coplanar and perpendicular to the longitudinal axis of the half-holder after grinding. The geometric provisions are incorporated for clamping the grooves 81 with the semi-cylindrical teeth of jaws 90, 92 having a function analogous to the positioning cylinders 82. The tooth 97 of the jaw 90 secured to the end 30b juts out over a small recess 98 above which the V-shaped grooves 81 of the half-holder 8b are enclasped by the semi-cylindrical jaw teeth.

However, as shown in FIG. 8, the semi-cylindrical tooth 99 on the pivotable jaw 92 can be a semi-cylindrical elastomeric buffer tht is fixed in the jaw 92 so as to spread the tightening load and dampen, in conjunction with the spring 94, the thrust loads due to abrasive wheel action during the grinding operation.

After clasping the half-holders 8a and 8b in the respective vises 9a and 9b of workpiece holder ends 30a and 30b such that the sawed edges and the ends of optical fiber Fa and Fb extend before the end faces 30a and 30b opposite the front working surface of the abrasive wheel 2, the edges 83 of the half-holders 8a and 8b are aligned in a plane parallel to the front surface of the abrasive wheel 2 by means of chucks 980. The abrasive wheel grinding run depth is adjusted by the adjusting means 6 (FIG. 5). Grinding is achieved by bringing the workpiece holder ends 30a and 30b together.

Figure 9A:
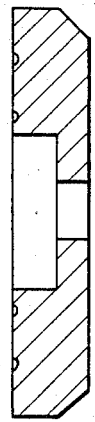
FIGS. 9A to 9C depict various abrasive wheel profiles.
Figure 9B:
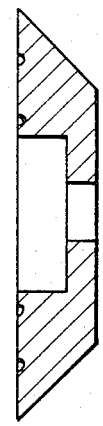
Figure 9C:
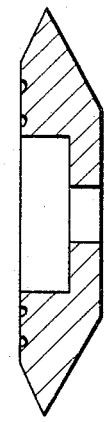

Various forms of abrasive wheels can be employed, as depicted in FIGS. 9A to 9C. The abrasive wheel 2 is a diamond-set disc of the flat plate type (FIG. 9a) or, preferably of the plate type with a single conical chamfer (FIG. 9b) or a double conical chamfer (FIG. 9c). The conical-chamfer diamond-set abrasive wheels (FIGS. 9B and 9C) advantageously make it possible to commence the machining operation by cutting off at least the ends of the optical fibers Fa, Fb protruding from the sawed edges of the half-holders 8a, 8b. Furthermore, the abrasive wheel structure, i.e., the spacing coefficient of the wheel abrasive grains or the concentration thereof, and the wheel hardness, i.e., the grade or cohesion force maintaining the abrasive grains, can be staggered over several concentric portions of the front working surface of the abrasive wheel. The staggering of the various concentric portions is such that, starting from the outer circumference of the abrasive wheel, the abrasive portion structures are tighter and tighter or more and more compact, such that the size and hardness of the abrasive grains respectively decrease and increase. Staggering of this nature in the abrasive enables the roughing, intermediate and finishing grinding phases to be performed in a single grinding run, i.e., each time workpiece holder ends 30a and 30b are brought together. The operations are performed on the half-holder 8a and 8b cut edges and optical fiber Fa and Fb ends.

After the half-holders 8a and 8b and fibers have been ground, they return to the initial positions thereof simultaneously with withdrawal of the abrasive wheel 2; the ground edges of the half-holders are now butted together and aligned two by two. For these purposes, the ground edges are covered with an index adaptation agent having a refraction index corresponding to that of the optical fiber core so as to reduce transmission losses due to a gap between abutting ends of the fibers.

The ends of fibers Fa and Fb on the two half-holders 8a and 8b are then aligned by laying the two calibrated alignment cylinders 82 in the V-shaped longitudinal grooves 81, as indicated in FIGS. 6 and 7. A force is exerted on cylinders 82 by horse-shoe flexible clips 85a and 85b, shaped with flat or curvilinear loops. Each of clips 85 has two S-shaped elbow ends 86 which close around the opposite circumferences of the cylinders 82. As depicted in FIG. 6, the loops 87 of these attachment fittings contact the inside walls of the box 88 of the connection device in order to dampen any vibrations, especially radial vibrations on the joint between the optical fibers. The vibrations are dampened when the fibers are initially connected, when cables containing the fibers are lain on site and thereafter.

In lieu of the illustrated single horse-shoe clips, the latter can be replaced by double horse-shoe rings having symmetrical sections with respect to the horizontal median plane of the half-holders.

Flat, cylindrical half-holders 8a and 8b can have V-shaped diametrally opposed alignment grooves 81 in opposite vertical walls and a top face having small circular grooves 80 that are evenly spaced above and below the alignment grooves. In this case, if the covering half-plates 84a, 84b are utilized, they are formed of two cylindrical half-shells. The half-shells may be replaced by a fast-setting bonding layer equivalent to the layer 84, but having a depth practically equal to that of the plates 84a and 84b.

What we claim is:

1. A front surface grinding machine adapted to have a front surface abrasive wheel mounted thereon comprising:
   a wheelhead spindle for carrying the abrasive wheel, means for rotating said wheelhead spindle,
   a holder for carrying a workpiece,
   first means for imparting back and forth rotational motion to said workpiece holder about an axis parallel to an axis of said wheelhead spindle and in a circular sector having first and second points, the workpiece carried by said holder being rotated between the front and the side of a front working surface of said abrasive wheel when the holder is at the first and second points respectively,
   second means for imparting back and forth translational motion to said wheelhead spindle, the translational motion being along the spindle axis between a first position where the workpiece is ground by said abrasive wheel working surface and a second position where said abrasive wheel is disengaged from the ground workpiece in front of said front working surface of said abrasive wheel, and
   drive means cooperating with said first and second imparting means for driving the spindle so the abrasive wheel is pulled from said first position to said second position while said workpiece holder rotates from the front to the side of said abrasive wheel working surface where the ground workpieces are removed, the rotary speed of said workpiece holder in moving from the side to the front of said abrasive wheel front working surface, where the workpieces are ground by the abrasive wheel, being slower than the rotary speed of the workpiece holder in moving from the front to the side of the abrasive wheel front working surface where the ground workpieces are not contacting the abrasive wheel.

2. The front surface grinding machine of claim 1 wherein said first means comprises a member having a first end fixed transversely to a rotary shaft of said workpiece holder,
   a slide having one side sloped with respect to said rotary shaft,
   means for urging the second end of said member against said sloped side of said slide,
   and means for imparting translational motion to said slide parallel to said rotary shaft.

3. The front surface grinding machine of claim 2 wherein said second end of said member is a roller.

4. The front surface grinding machine of claim 2 wherein said wheelhead spindle translational motion imparting means simultaneously imparts translational motion to said slide and said wheelhead spindle.

5. The front surface grinding machine of claim 4 wherein the path followed by said slide is longer than that of said wheelhead spindle.

6. The front surface grinding machine of claim 4 wherein said wheelhead spindle and slide simultaneous translational motion imparting means comprises an actuator acting on a lever having a stationary pivot point for pushing said wheelhead spindle and said slide.

7. The front surface grinding machine of claim 2 wherein said slide translational motion imparting means imparts the reciprocating motion to the workpiece holder.

8. The front surface grinding machine of claim 2 wherein said means for imparting translational motion to said slide in the direction corresponding to the workpiece holder rotation direction from the side to the front of said abrasive wheel front working surface comprises an endless screw, means for rotating the endless screw, and a nut linked to said slide and running on said endless screw.

9. The front surface grinding machine of claim 8 further comprising means for driving said nut in translation off said endless screw during translational motion of said wheelhead spindle away from the circular rotation of said ground workpiece from the front to the side of said abrasive wheel front working surface.

10. The front surface grinding machine of claim 1 further including a guide in which said wheelhead spindle slides parallel to its axis, elastic means for pushing said wheelhead spindle in the direction of said workpiece holder and against one end of said guide, and means for positioning said wheelhead spindle in said guide to adjust the grinding run depth.

11. The front surface grinding machine of claim 10 wherein said grinding run depth adjusting means comprises vernier means for translating a wedge having one side which is inclined to the axis of said guide, the wedge being located between the portion of said spindle sliding in said guide and an end of said guide.

12. The front surface grinding machine of claim 1 further comprising a second workpiece holder driven by reciprocating and rotational motion imparting means analogous to that of the aforesaid workpiece holder.

13. The front surface grinding machine of claim 12 wherein said two workpiece holders are substantially diametrally opposed with respect to said abrasive wheel and are driven to rotate in opposite directions.

14. The front surface grinding machine of claim 13 wherein said workpiece holder rotational imparting means comprises:
   for each individual holder a respective member having a first end fixed transversely to the rotation shaft of the respective workpiece holder,
   a common slide for both holders, the slide having two sides symmetrically sloped with respect to the sliding axis of said slide that is parallel to said rotation shafts,
   common means for both holders for drawing the second ends of said respective members against two sloped sides of said slide, respectively, and
   means for imparting translational motion to said slide parallel to said rotary shafts.

15. In combination, a front surface grinding machine of the type adapted to have an abrasive wheel mounted thereon and including:
   a wheelhead spindle for carrying the abrasive wheel,
   means for rotating said wheelhead spindle,
   a holder for carrying a workpiece,
   first means for imparting back and forth rotational motion to said workpiece holder about an axis parallel to an axis of said wheelhead spindle and in a circular sector having first and second points, the workpiece carried by said holder being rotated between the front and the side of a front working surface of said abrasive wheel when the holder is at the first and second points respectively,
   second means for imparting back and forth translational motion to said wheelhead spindle, the translational motion being along the spindle axis between a first position where the workpiece is ground by said abrasive wheel working surface and a second position where said abrasive wheel is disengaged from the ground workpiece in front of said front working surface of said abrasive wheel, and
   drive means cooperating with said first and second imparting means for driving the spindle so the abrasive wheel is pulled from said first position to said second position while said workpiece holder rotates from the front to the side of said abrasive wheel working surface where the ground workpieces are removed;
   the workpiece holder adapted to hold the ends of optical fibers flush with a transverse edge of a multifiber holder during grinding, the fiber end being ground with a view to connecting optical fiber cables, said workpiece holder including a vise having semi-cylindrical jaw teeth for enveloping two parallel and longitudinal grooves in said multifiber holder, said grooves capturing cylinders for aligning a pair of identical ones of said multifiber holders and for connecting the fibers end to end in said holders, the workpiece holder holding the multifiber holder so that the protruding ends of the fibers face toward the abrasive front wheel surface as the holder moves toward the first position so that the fibers first engage peripheral portions of the abrasive surface and move radially toward central portions of the abrasive surface;
   the rotary speed of said workpiece holder in moving from the side to the front of said abrasive wheel front working surface, where the workpieces are ground by the abrasive wheel, being slower than the rotary speed of the workpiece holder in moving from the front to the side of the abrasive wheel front working surface where the ground workpieces are not contacting the abrasive wheel, the abrasive wheel thus being quickly disengaged from the protruding ends of fibers to prevent scratches on the ground protruding end surfaces of the fibers.

16. The front surface grinding machine of claim 15 wherein said abrasive wheel has a conical chamfer.

17. The front surface grinding machine of claim 16 wherein the abrasive wheel includes a front working surface having concentric circular portions having different structures, grades and grain sizes.

18. The combination of claim 15 wherein the vise includes means for limiting tightening loads on the jaw teeth.

19. The combination of claim 15 wherein the vise includes a pair of jaws having said jaw teeth, one of said jaws being pivotable with respect to the other jaw, and a spring for drawing back one of the jaws with respect to the other jaw.

20. The combination of claim 15 wherein the vise includes a pair of jaws having said jaw teeth, the jaw teeth of one of the jaws being an elastic buffer.

21. Apparatus for cutting ends of first and second optical fiber cables each having an axially symmetrical structure, the ends of the fibers to be butted together after having been cut, comprising first and second half work holders having grooves for respectively receiving unsheathed ends of the fibers of the first and second cables, the fibers being inserted into the half work holders so that ends of the fibers protrude slightly from transverse faces of the half work holders, means for grinding the protruding ends including: a front surface grinding machine having a front grinding surface abrasive wheel, first and second workpiece holders for respectively carrying the first and second work holders so that the protruding ends face toward the front grinding surface of the wheel, means for rotating the grinding wheel about a rotary axis thereof, means activated while the grinding wheel is rotating about the rotary axis for turning the work piece holders with the half work holders therein from a position to the side of the grinding wheel front grinding surface to a position in front of the grinding wheel front grinding surface so that the transverse faces and the protruding ends contact and are ground by the grinding wheel front grinding surface, whereby the protruding ends are removed from the remainder of the fibers, means for the retracting the wheel front grinding surface from the region where the ends were cut by shifting the front surface grinding wheel away from the workpiece holders along the rotary axis, the means for turning the workpiece holders turning the workpiece holders away from the rotary axis and the front of the front grinding surface while the means for retracting shifts the grinding wheel away front the workpiece holders, so as to prevent scratching of the ground workpieces.

22. The apparatus of claim 21 wherein the means for turning the first and second workpiece holders includes means for turning the first and second workpiece holders from positions to the side of the front grinding surface on opposite sides of the rotary axis to regions that are symmetrical on the front of the front grinding surface on opposite sides of the rotary axis so that the protruding ends traverse symmetrical and opposite paths across the abrasive surface, the opposite paths being such that the fibers first engage peripheral portions of the abrasive surface and while in engagement with the abrasive surface move radially toward central portions of the abrasive surface.

23. A method of cutting ends of first and second optical fiber cables each having an axially symmetrical structure, the ends of the fibers to be butted together after having been cut, comprising the steps of inserting unsheathed ends of the fibers of the first and second cables into grooves of first and second half work holders, respectively, the fibers being inserted into the half work holders so that ends of the fibers protrude slightly from transverse faces of the half work holders, then grinding the protruding ends by: respectively inserting the first and second half work holders into first and second workpiece holders of a front surface grinding machine having a front grinding surface abrasive wheel so that the protruding ends face toward the front grinding surface of the wheel, then, while the grinding wheel is rotating about a rotary axis turning the workpiece holders with the half work holders therein from a position to the side of the grinding wheel front grinding surface to a position in front of the grinding wheel front grinding surface so that the transverse faces and the protruding ends contact and are ground by the grinding wheel front grinding surface, whereby the protruding ends are removed from the remainder of the fibers, then retracting the wheel front grinding surface from the region where the ends were cut by shifting the front surface grinding wheel away from the workpiece holders along the rotary axis while the workpiece holders are turned away from the rotary axis and the front of the front grinding surface, so as to prevent scratching of the ground workpieces.

24. The method of claim 23 wherein the first and second half work holders are integral with each other and have aligned grooves for receiving the fibers of the first and second cables when the fibers are initially inserted therein, and separating the half work holders from each other with the fibers in the aligned grooves by sawing transversely to the axis of the grooves and fibers along the thus formed transverse faces.

25. The method of claim 24 wherein the integral first and second half work holders include notches on opposite sides thereof at right angles to the transverse face, clamping the integral first and second half work holders in vise jaws of the grinding machine by inserting spring loaded cylinders of the vise jaws therein, the separating step being performed while the integral half work holders are so clamped.

26. The method of claim 25 wherein the notches on the opposite sides of the integral work holders become, after the cutting step, notches on each of a pair of opposite sides of the first and second half workpieces, engaging each thus formed notch on the first and second half workpieces with a tooth of the workpiece holder, and applying opposed clamping forces to the teeth on the opposite sides of each half holder to hold the half holders in the workpiece holders while the fiber ends are being ground.

27. The method of claim 23 wherein each half holder includes a notch on each of a pair of opposite sides at right angles to the transverse face, engaging each notch with a tooth of the workpiece holder, and applying opposed clamping forces to the teeth on the opposite sides of each half holder to hold the half holders in the workpiece holders while the fiber ends are being ground.

28. The method of claim 23 wherein the half work holders move from the side position to the front position so that the fibers first engage peripheral portions of the abrasive surface and move radially toward central portions of the abrasive surface.

29. The method of claim 23 wherein the abrasive wheel has a conical chamfer.

30. The method of claim 29 wherein the abrasive wheel includes a front working surface having concentric circular portions having different structures, grades and grain sizes.

* * * * *